(12) United States Patent
Bangalore et al.

(10) Patent No.: US 11,429,876 B2
(45) Date of Patent: Aug. 30, 2022

(54) INFUSING KNOWLEDGE INTO NATURAL LANGUAGE PROCESSING TASKS USING GRAPH STRUCTURES

(71) Applicant: International Business Machines Corporation, Armonk, NY (US)

(72) Inventors: Pavan Kapanipathi Bangalore, Westchester, NY (US); Kartik Talamadupula, Port Chester, NY (US); Veronika Thost, Cambridge, MA (US); Siva Sankalp Patel, White Plains, NY (US); Ibrahim Abdelaziz, Tarrytown, NY (US); Avinash Balakrishnan, Elmsford, NY (US); Maria Chang, Irvington, NY (US); Kshitij Fadnis, Astoria, NY (US); Chulaka Gunasekara, New Hyde Park, NY (US); Bassem Makni, Bellevue, WA (US); Nicholas Mattei, New Orleans, LA (US); Achille Belly Fokoue-Nkoutche, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 16/814,830

(22) Filed: Mar. 10, 2020

(65) Prior Publication Data
US 2021/0287103 A1    Sep. 16, 2021

(51) Int. Cl.
*G06N 5/02*    (2006.01)
*G06F 40/40*   (2020.01)

(52) U.S. Cl.
CPC ............ *G06N 5/02* (2013.01); *G06F 40/40* (2020.01)

(58) Field of Classification Search
None
See application file for complete search history.

(56) References Cited

U.S. PATENT DOCUMENTS

| 9,582,496 B2 | 2/2017 | Cecchi et al. |
| 10,169,454 B2 | 1/2019 | Ait-Mokhtar et al. |

(Continued)

OTHER PUBLICATIONS

Annervaz, K.M., et al., "Learning Beyond Datasets: Knowledge Graph Augmented Neural Networks for Natural Language Processing", Proceedings of NAACL-HLT2018, Jun. 1-6, 2018, pp. 313-322, Association for Computational Linguistics, United States.

(Continued)

*Primary Examiner* — Phirin Sam
(74) *Attorney, Agent, or Firm* — Sherman IP LLP; Kenneth L. Sherman; Hemavathy Perumal

(57) ABSTRACT

One embodiment of the invention provides a method for natural language processing (NLP). The method comprises extracting knowledge outside of text content of a NLP instance by extracting a set of subgraphs from a knowledge graph associated with the text content. The set of subgraphs comprises the knowledge. The method further comprises encoding the knowledge with the text content into a fixed size graph representation by filtering and encoding the set of subgraphs. The method further comprises applying a text embedding algorithm to the text content to generate a fixed size text representation, and classifying the text content based on the fixed size graph representation and the fixed size text representation.

20 Claims, 9 Drawing Sheets

(56) References Cited

U.S. PATENT DOCUMENTS

| | | | |
|---|---|---|---|
| 10,346,539 B2 | 7/2019 | Cecchi et al. | |
| 10,943,072 B1* | 3/2021 | Jaganmohan | G06N 5/041 |
| 11,113,175 B1* | 9/2021 | Adamo | G06F 40/216 |
| 2019/0215545 A1* | 7/2019 | Gupta | H04N 21/4884 |
| 2019/0391992 A1* | 12/2019 | Shah | G06F 16/9024 |
| 2020/0104729 A1* | 4/2020 | Busbridge | G06N 3/082 |
| 2020/0167664 A1* | 5/2020 | Stevens | G06N 5/02 |
| 2020/0342055 A1* | 10/2020 | Patra | G06N 5/003 |
| 2020/0364408 A1* | 11/2020 | Lao | G06F 40/30 |
| 2021/0158127 A1* | 5/2021 | Ren | G06N 3/04 |
| 2021/0165959 A1* | 6/2021 | McNeil | G06N 3/084 |
| 2021/0201015 A1* | 7/2021 | Araki | G06N 3/0454 |

OTHER PUBLICATIONS

Chen, M., "Learning Knowledge Graph Embeddings for Natural Language Processing," Winter 2017, pp. 1-57, University of California, Los Angeles, United States.

Anonymous, "Method of Presenting and Generating Multi-Dimensional Semantic Graph for a Knowledge System," Sep. 19, 2011, pp. 1-3, IPCOM000210947D, ip.com, United States.

Anonymous, "System and Method for Increasing Productivity via Task-Oriented Semantic Graphs", Jun. 2, 2015, pp. 1-4, IPCOM000241826D, ip.com, United States.

Anonymous, "Graph Data Summarization in Natural Language", Apr. 5, 2018, pp. 1-4, IPCOM000253503D; ip.com, United States.

{Grace Period Disclosure}: Kapanipathi, P. et al., "Infusing Knowledge into the Textual Entailment Task Using Graph Convolutional Networks", Nov. 5, 2019, arXiv preprint arXiv: arXiv:1911.02060, Cornell University, United States.

Mell, P., et al., "The NIST Definition of Cloud Computing", National Institute of Standards and Technology Special Publication 800-145, Sep. 2011, pp. 1-7, U.S. Department of Commerce, United States.

Wang, X. et al., "Improving Natural Language Inference Using External Knowledge in the Science Questions Domain." In Proceedings of the AAAI Conference on Artificial Intelligence, pp. 7208-7215. 2019, vol. 33, arXiv:1809.05724, United States.

Lalithsena, S., et al., "Domain-specific hierarchical subgraph extraction: A recommendation use case," In 2017 IEEE International Conference on Big Data (Big Data), Dec. 11-14, 2017, pp. 666-675, IEEE, United States {Abstract Only}.

Ma, T., et al., "AWE: Asymmetric Word Embedding for Textual Entailment," arXiv preprint arXiv: 1809.04047, Sep. 11, 2018, pp. 1-8, United States.

Duan, C., et al., "Attention-Fused Deep Matching Network for Natural Language Inference," In Proceedings of the Twenty-Seventh International Joint Conference on Artificial Intelligence, Jul. 13, 2018, pp. 4033-4040, United States.

Chen, Q., et al., "Natural language inference with external knowledge", arXiv preprint arXiv:1711.04289, Nov. 12, 2017, pp. 1-10, United States.

* cited by examiner

INFUSING KNOWLEDGE INTO NATURAL LANGUAGE PROCESSING TASKS USING GRAPH STRUCTURES

STATEMENT REGARDING PRIOR DISCLOSURES BY THE INVENTOR OR A JOINT INVENTOR

The following disclosure is submitted under 35 U.S.C. 102(b)(1)(A): DISCLOSURE: Infusing Knowledge into the Textual Entailment Task Using Graph Convolutional Networks, Pavan Kapanipathi, Veronika Thost, Siva Sankalp Patel, Spencer Whitehead, Ibrahim Abdelaziz, Avinash Balakrishnan, Maria Chang, Kshitij Fadnis, Chulaka Gunasekara, Bassem Makni, Nicholas Mattei, Kartik Talamadupula, Achille Fokoue, Nov. 5, 2019, arXiv preprint arXiv: arXiv:1911.02060, Cornell University, 2019.

BACKGROUND

The field of embodiments of the invention generally relate to natural language processing (NLP).

NLP is a field of artificial intelligence concerned with interactions between computers and human languages, such as how to program computers to process and analyze large amounts of natural language data, and derive meaning from human languages in a smart and useful way. Examples of different NLP tasks include, but are not limited to, question answering (QA), natural language inference (i.e., textual entailment), etc.

Natural language inference comprises determining whether a "hypothesis" is true (entailment), false (contradiction), or undetermined (neutral) given a "premise". Some conventional approaches for natural language inference include embedding-based approaches that focus purely on embeddings in a text-based knowledge space and not explicit structure such as structural information from knowledge graphs (i.e., graph structure or graph information). Such approaches lose out on additional information that makes it possible to situate context in a graph-based knowledge space. Other conventional approaches for natural language inference include attention-based neural approaches that only use the notion of attention without explicitly externalizing what function represents the attention. There are also come conventional approaches for natural language inference that include graph-based approaches that are either very narrowly specific to domains or take very limited graph information into account. Therefore, there is a need to infuse knowledge into NLP tasks using graph structures.

SUMMARY

Embodiments of the invention generally relate to natural language processing (NLP), and more specifically, to a method and system for infusing knowledge into NLP tasks using graph structures.

One embodiment of the invention provides a method for NLP. The method comprises extracting knowledge outside of text content of a NLP instance by extracting a set of subgraphs from a knowledge graph associated with the text content. The set of subgraphs comprises the knowledge. The method further comprises encoding the knowledge with the text content into a fixed size graph representation by filtering and encoding the set of subgraphs. The method further comprises applying a text embedding algorithm to the text content to generate a fixed size text representation, and classifying the text content based on the fixed size graph representation and the fixed size text representation. The knowledge graph is one of a knowledge base, a semantic network, or a social graph. Other embodiments include a system for NLP and a computer program product for NLP. These features contribute to the advantage of combining two different knowledge spaces, a graph-based knowledge space and a text-based knowledge space, to classify the text content of the NLP instance. These features also contribute to the advantage of providing a solution to NLP that encodes relevant external knowledge using structural information from knowledge graphs for use in downstream NLP tasks (e.g., question answering (QA), textual entailment, etc.) in a generalizable and scalable way. Structural information from knowledge graphs makes it possible to situate context in the graph-based knowledge space.

One or more of the following features may be included. In some embodiments, the text content of the NLP instance includes a premise and a hypothesis. These optional features contribute to the advantage of providing a natural language inference classifier that combines two different knowledge spaces, the graph-based knowledge space and the text-based knowledge space, to classify the text content of the NLP instance.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

Figure 1:
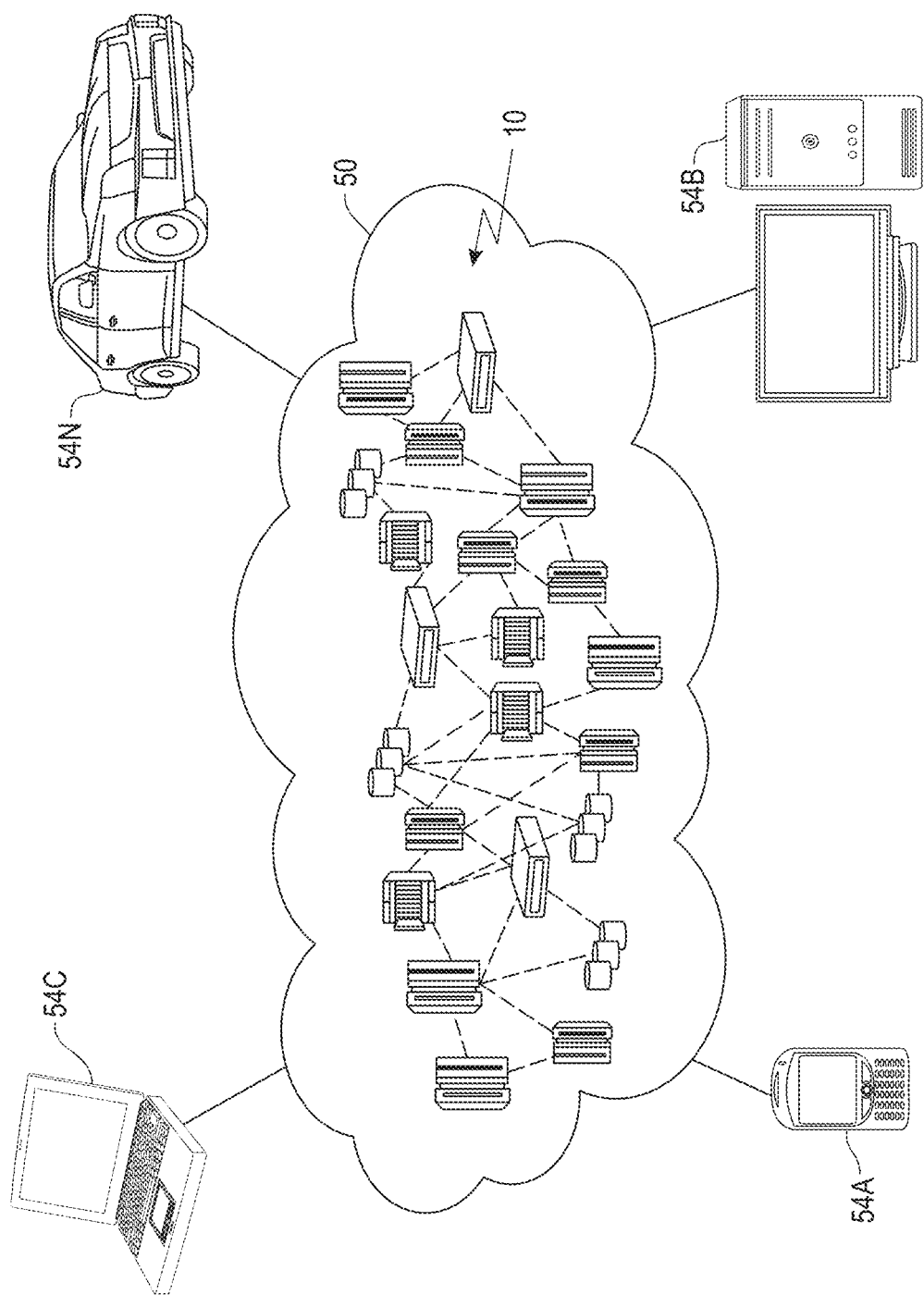
FIG. 1 depicts a cloud computing environment according to an embodiment of the present invention.

The detailed description explains the preferred embodiments of the invention, together with advantages and features, by way of example with reference to the drawings.

DETAILED DESCRIPTION

Embodiments of the invention generally relate to natural language processing (NLP), and more specifically, to a method and system for infusing knowledge into NLP tasks using graph structures. One embodiment of the invention provides a method for NLP. The method comprises extracting knowledge outside of text content of a NLP instance by extracting a set of subgraphs from a knowledge graph associated with the text content. The set of subgraphs comprises the knowledge. The method further comprises encoding the knowledge with the text content into a fixed size graph representation by filtering and encoding the set of subgraphs. The method further comprises applying a text embedding algorithm to the text content to generate a fixed size text representation, and classifying the text content based on the fixed size graph representation and the fixed size text representation.

Another embodiment of the invention provides a system for NLP. The system comprises at least one processor, and a non-transitory processor-readable memory device storing instructions that when executed by the at least one processor causes the at least one processor to perform operations. The operations include extracting knowledge outside of text content of a NLP instance by extracting a set of subgraphs from a knowledge graph associated with the text content. The set of subgraphs comprises the knowledge. The operations further include encoding the knowledge with the text content into a fixed size graph representation by filtering and encoding the set of subgraphs. The operations further include applying a text embedding algorithm to the text content to generate a fixed size text representation, and classifying the text content based on the fixed size graph representation and the fixed size text representation.

One embodiment of the invention provides a computer program product for NLP. The computer program product comprises a computer readable storage medium having program instructions embodied therewith, the program instructions executable by a processor to cause the processor to extract knowledge outside of text content of a NLP instance by extracting a set of subgraphs from a knowledge graph associated with the text content. The set of subgraphs comprises the knowledge. The program instructions are further executable by the processor to cause the processor to encode the knowledge with the text content into a fixed size graph representation by filtering and encoding the set of subgraphs, apply a text embedding algorithm to the text content to generate a fixed size text representation, and classify the text content based on the fixed size graph representation and the fixed size text representation.

For expository purposes, the term "NLP instance" as used herein generally refers to a NLP task (or NLP problem). For expository purposes, the term "text content" as used herein generally refers to any information accompanying a NLP instance (i.e., information that comes with the NLP instance).

Embodiments of the invention encode relevant external knowledge using structural information from knowledge graphs for use in downstream NLP tasks (e.g., question answering (QA), textual entailment, etc.) in a generalizable and scalable way. The external knowledge can include, but is not limited to, domain-specific and detailed knowledge. The external knowledge is contextual information that is not included in content of a specific NLP instance. The external knowledge is codified and encoded as a graph.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
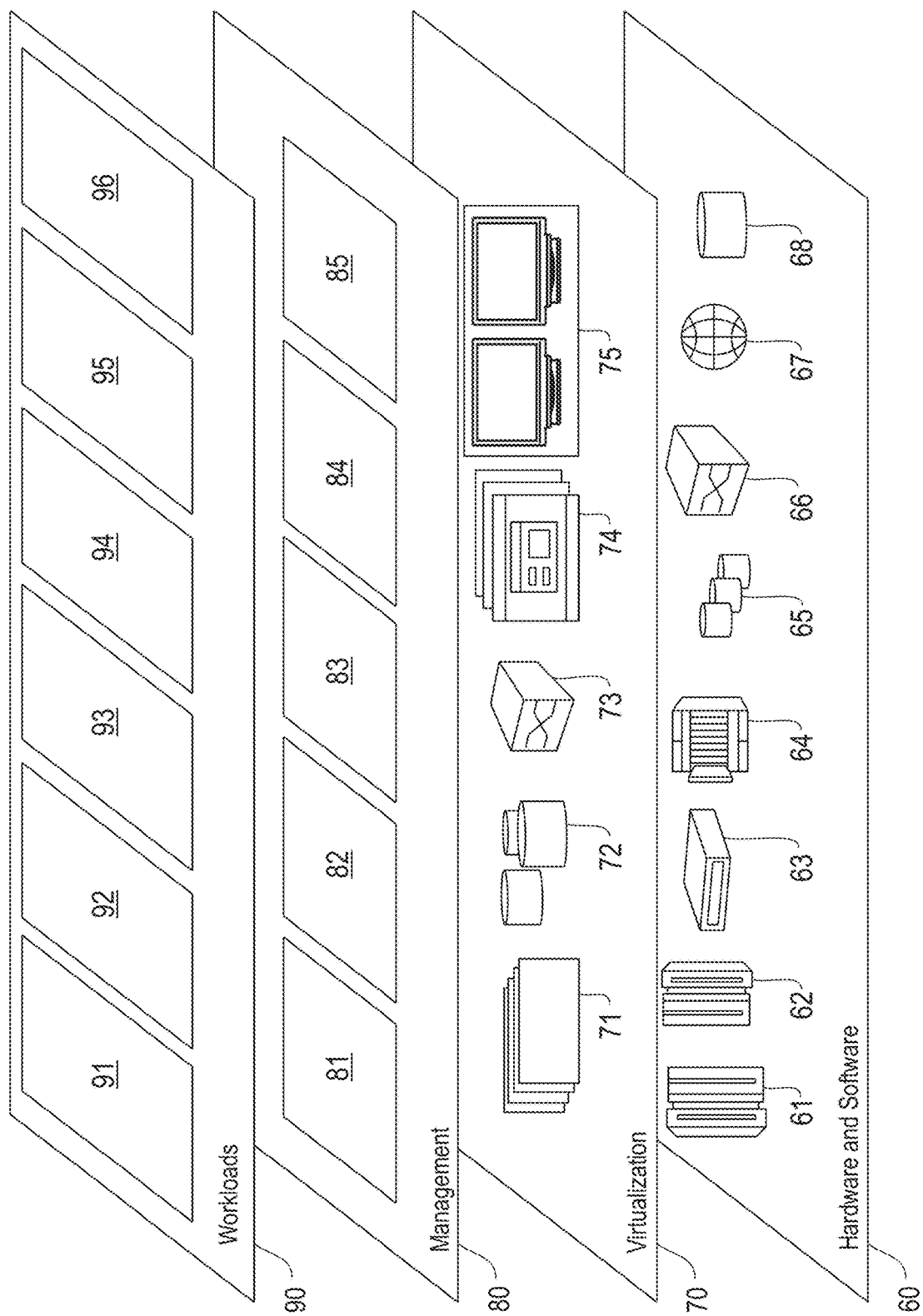
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and NLP 96 (e.g., a NLP system 330, as described in detail later herein).

Figure 3:
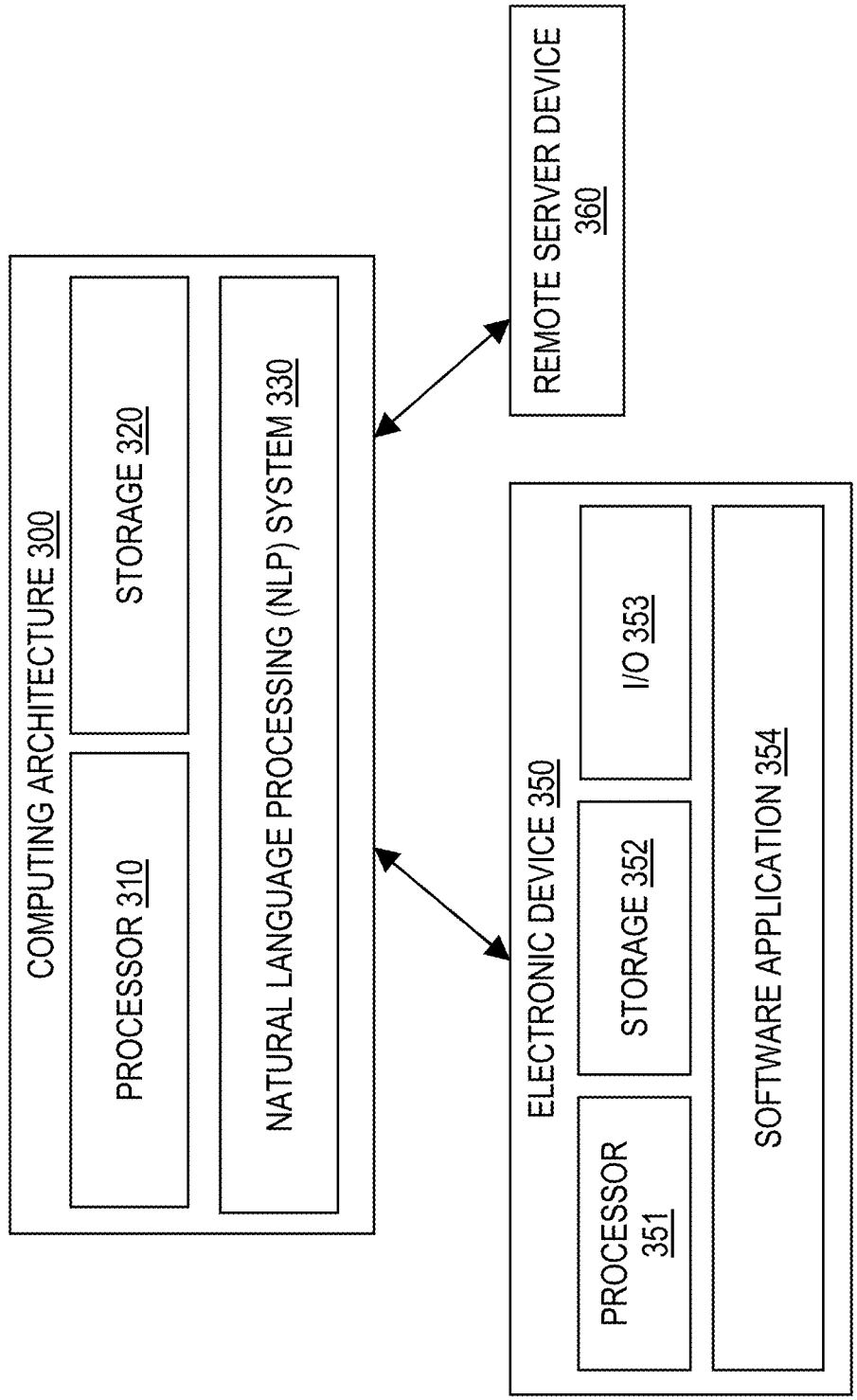
FIG. 3 illustrates an example computing architecture for infusing external knowledge into one or more natural language processing (NLP) tasks using a graph structure, in accordance with an embodiment of the invention.

FIG. 3 illustrates an example computing architecture 300 for infusing external knowledge into one or more NLP tasks using a graph structure, in accordance with an embodiment of the invention. In one embodiment, the computing architecture 300 is a centralized computing architecture. In another embodiment, the computing architecture 300 is a distributed computing architecture.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, a NLP system 330 configured to infuse external knowledge into one or more NLP tasks using a graph structure. As described in detail later herein, the NLP system 330 is configured to receive first information accompanying a NLP instance, extract additional information from the first information, and encode the additional information with the first information into a graph structure. For example, if the NLP instance comprises a textual entailment problem, the first information comprises premise text and hypothesis text associated with the problem.

In one embodiment, the NLP system 330 is configured to exchange data with one or more electronic devices 350 and/or one or more remote server devices 360 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, NLP applications, etc.

Examples of an electronic device 350 include, but are not limited to, a desktop computer, a mobile electronic device (e.g., a tablet, a smart phone, a laptop, etc.), a wearable device (e.g., a smart watch, etc.), an Internet of Things (IoT) device, a smart appliance such as a smart television, etc.

In one embodiment, an electronic device 350 comprises one or more input/output (I/O) units 353 integrated in or coupled to the electronic device 350, such as a keyboard, a keypad, a touch interface, a display screen, etc. A user may utilize an I/O module 353 of an electronic device 350 to configure one or more user preferences, configure one or more parameters (e.g., validation properties, thresholds, etc.), provide input, etc.

In one embodiment, an electronic device 350 and/or a remote server device 360 may be a source of historical data and/or a document.

In one embodiment, the NLP system 330 may be accessed or utilized by one or more online services (e.g., AI services, NLP services) hosted on a remote server device 360 and/or one or more software applications 354 (e.g., AI applications, NLP applications) operating on an electronic device 350. For example, in one embodiment, a virtual assistant, a search engine, or another type of software application 354 operating on an electronic device 350 can invoke the system 330 to perform a NLP task.

Figure 4:
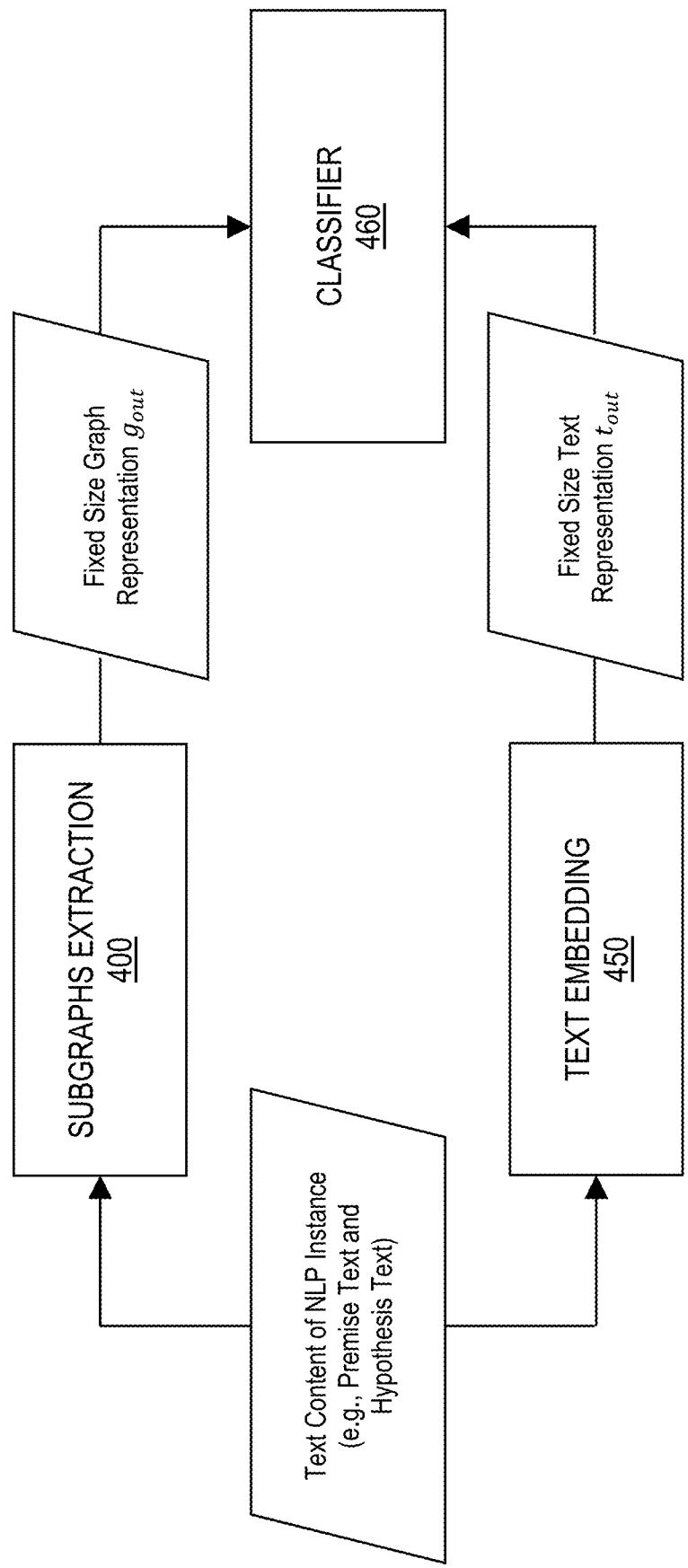
FIG. 4 illustrates an example NLP system, in accordance with an embodiment of the invention.

FIG. 4 illustrates an example NLP system 330, in accordance with an embodiment of the invention. In one embodiment, the system 330 comprises a subgraphs extraction system 400 configured to: (1) receive, as input, text content of a NLP instance, and (2) embed the NLP instance in a graph-based knowledge space. In one embodiment, the subgraphs extraction system 400 is configured to embed a NLP instance in a graph-based knowledge space by: (1) extracting external knowledge from a knowledge graph associated with text content of the NLP instance, wherein the external knowledge comprises contextual information that is outside of the text content (i.e., additional information or intermediary information that is not present in the text content), and (2) encoding the external knowledge with the text content into a fixed size graph representation. For example, in one embodiment, the subgraphs extraction system 400 is configured to: (1) extract external knowledge from the knowledge graph by extracting one or more subgraphs from the knowledge graph, wherein the one or more subgraphs comprise the external knowledge, and (2) encoding the external knowledge with the text content by filtering and encoding the one or more subgraphs based on structural information of the knowledge graph to generate, as output, a fixed size graph representation $g_{out}$ of the text content the NLP instance and the external knowledge.

In one embodiment, a knowledge graph is one of, but not limited to, a knowledge base, a semantic network (e.g., ConceptNet), a social graph (i.e., a graph representation of a social network), etc.

In one embodiment, a knowledge graph is one of a directed graph representation or an undirected graph representation of text content of a NLP instance.

In one embodiment, if a NLP instance comprises a textual entailment problem, text content of the NLP instance comprises text samples such a text sample labeled as premise (i.e., premise text) and a text sample labeled as hypothesis (i.e., hypothesis text).

In one embodiment, the system 330 comprises a text embedding unit 450 configured to: (1) receive, as input, text content of a NLP instance, (2) embed the NLP instance in a text-based knowledge space by applying text embedding to the text content of the NLP instance to generate one or more embeddings (e.g., word embeddings or vector representations for words), and (3) generate, as output, a fixed size text representation $t_{out}$ of the text content of the NLP instance based on the one or more embeddings. In one embodiment, the text embedding unit 450 is configured to apply a text embedding algorithm such as, but not limited to, Bidirectional Encoder Representations from Transformers (BERT), Word2vec, Global Vectors (GloVe), etc.

In one embodiment, the subgraphs extraction system 400 and the text embedding unit 450 operate in parallel. In another embodiment, the subgraphs extraction system 400 and the text embedding unit 450 operate sequentially.

In one embodiment, the system 330 comprises a classifier 460 configured to: (1) receive a fixed size graph representation $g_{out}$ of text content of a NLP instance and external knowledge (e.g., from the subgraphs extraction system 400), (2) receive a fixed size text representation $t_{out}$ of the text content of the NLP instance (e.g., from the text embedding unit 450), (3) classify the text content of the NLP instance with a final classification class (i.e., final prediction) based on the fixed size graph representation $g_{out}$ and the fixed size text representation $t_{out}$. Therefore, the classifier 460 combines two different knowledge spaces, the graph-based knowledge space and the text-based knowledge space, to classify the text instance of the NLP instance. In one embodiment, the classifier 460 is a natural language inference (NLI) classifier.

In one embodiment, the classifier 460 comprises a Feed Forward Network (FFN).

Figure 5:
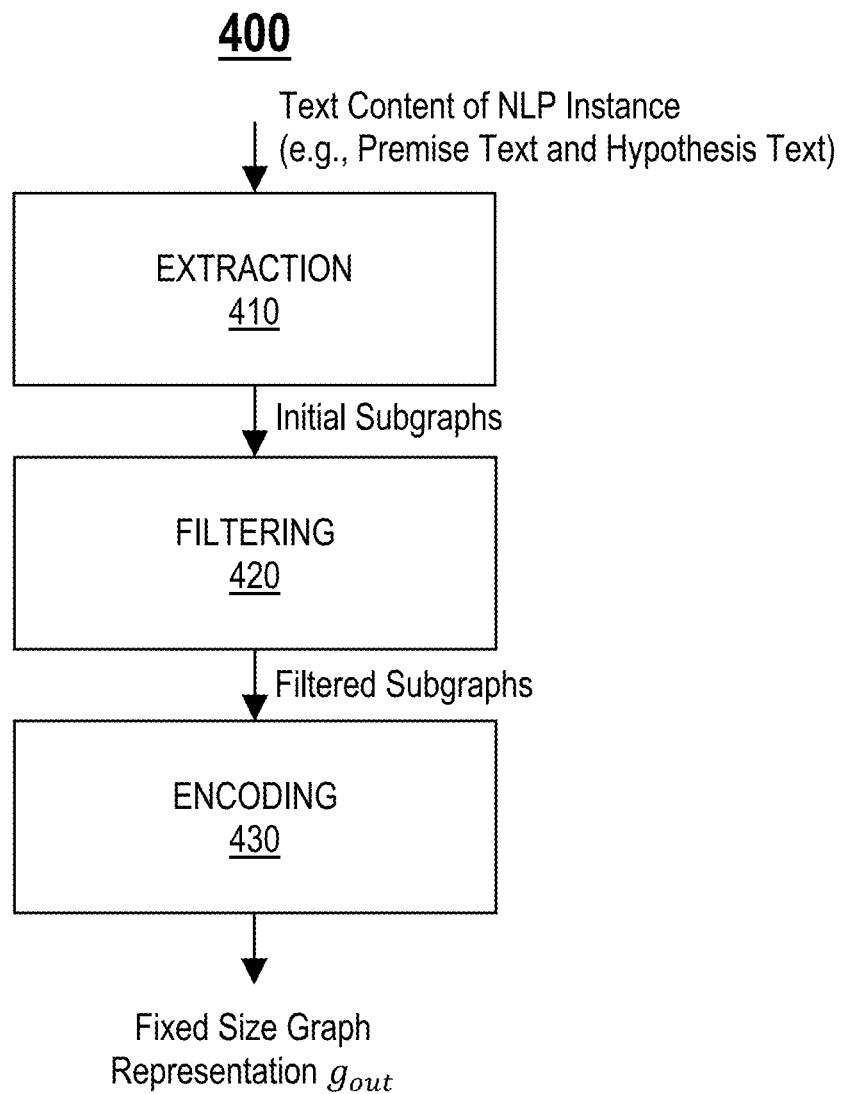
FIG. 5 illustrates an example subgraphs extraction system, in accordance with an embodiment of the invention.

FIG. 5 illustrates an example subgraphs extraction system 400, in accordance with an embodiment of the invention. In one embodiment, the system 400 comprises an extraction unit 410 configured to: (1) receive, as input, text content of a NLP instance, (2) extract external knowledge from a knowledge graph associated with the text content by extracting one or more initial subgraphs from the knowledge graph, wherein the one or more initial subgraphs comprise the text content and the external knowledge (i.e., additional information or intermediary information that is not present in the text content). In one embodiment, the one or more initial subgraphs comprise: (1) each entity included in the text content, and (2) for each entity included in the text content, one or more 1-hop neighbors of the entity, if any. Each 1-hop neighbor included in the one or more initial subgraphs represents contextual information that is outside of the text content of the NLP instance (i.e., external knowledge).

In one embodiment, the system 400 comprises a filtering unit 420 configured to: (1) receive one or more initial subgraphs comprising text content of a NLP instance and external knowledge (e.g., from the extraction unit 410), and (2) filter the one or more initial subgraphs based on a filtering algorithm, resulting in one or more filtered subgraphs.

In one embodiment, the one or more filtered subgraphs comprise: (1) one or more supernodes, and (2) for each supernode included in the one or more filtered subgraphs, one or more nodes that the supernode is a parent of. For example, if the text content of the NLP instance comprises a premise text and a hypothesis text, the one or more filtered subgraphs comprises: (1) a first filtered subgraph including a first supernode $p_s$ ("premise supernode") and each node that the premise supernode $p_s$ is a parent of (i.e., each entity included in the premise text and each 1-hop neighbor of the entity, if any), and (2) a second filtered subgraph including a second supernode $h_s$ ("hypothesis supernode") and each node that the hypothesis supernode $h_s$ is a parent of (i.e., each entity included in the hypothesis text and each 1-hop neighbor of the entity, if any).

In one embodiment, the filtering unit 420 is configured to apply any type of filtering algorithm such as, but not limited to, personalized page rank (PPR), etc. For example, in one embodiment, the filtering unit 420 applies PPR to each initial subgraph, resulting in a filtered subgraph comprising only nodes that satisfy a pre-determined PPR threshold.

In one embodiment, the system 400 comprises an encoding unit 430 configured to: (1) receive one or more filtered subgraphs comprising text content of a NLP instance and external knowledge (e.g., from the filtering unit 420), and (2) encode the one or more filtered subgraphs based on structural information of a knowledge graph that the subgraphs are extracted from to generate, as output, a fixed size graph representation $g_{out}$ of the text content and the external knowledge. In one embodiment, the encoding unit 430 utilizes a Relational Graph Convolutional Network (R-GCN) to encode the one or more filtered subgraphs.

Figure 6:
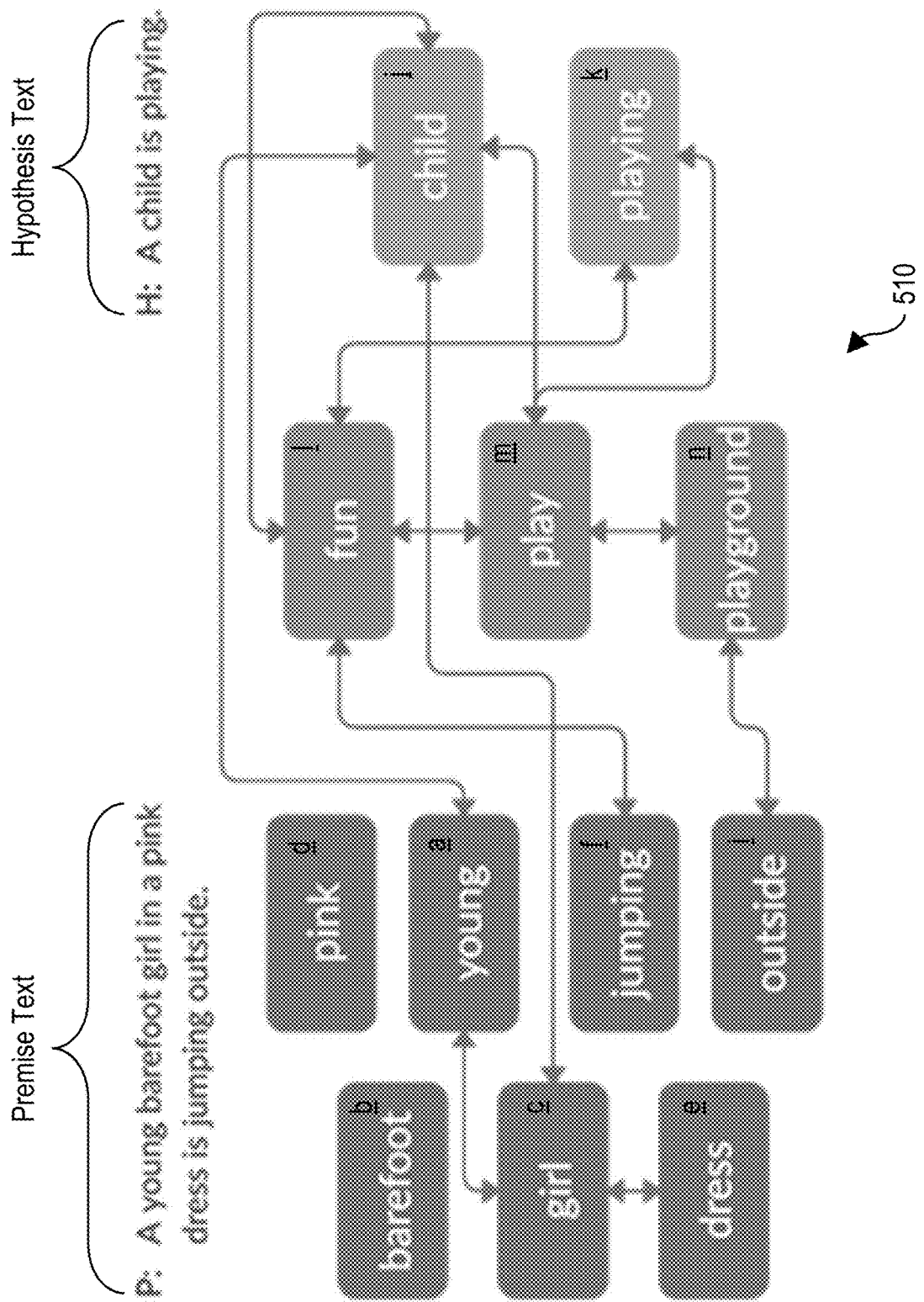
FIG. 6 illustrates example external knowledge extracted from a knowledge graph using the subgraphs extraction system, in accordance with an embodiment of the invention.

FIG. 6 illustrates example external knowledge extracted from a knowledge graph using the subgraphs extraction system 400, in accordance with an embodiment of the invention. Assume a NLP instance comprises a textual entailment problem and the system 400 receives the following text samples of the problem: (1) a premise text "A young barefoot girl in a pink dress is jumping outside.", and (2) a hypothesis text "A child is playing." The system 400 obtains a knowledge graph from a knowledge base or semantic network based on the premise text and the hypothesis text, and extracts a set 510 of subgraphs from the knowledge graph.

As shown in FIG. 6, the set 510 of subgraphs includes: (1) nodes representing entities of the premise text and the hypothesis text, and (2) additional nodes representing 1-hop neighbors of the entities. Specifically, the set 510 of subgraphs comprises: (1) nodes a, b, c, d, e, f, and i representing entities of the premise text, (2) nodes j and k representing entities of the hypothesis text, and (3) nodes l, m, and n representing additional information or intermediary information that is not present in the premise text and the hypothesis text (i.e., external knowledge).

Figure 7:
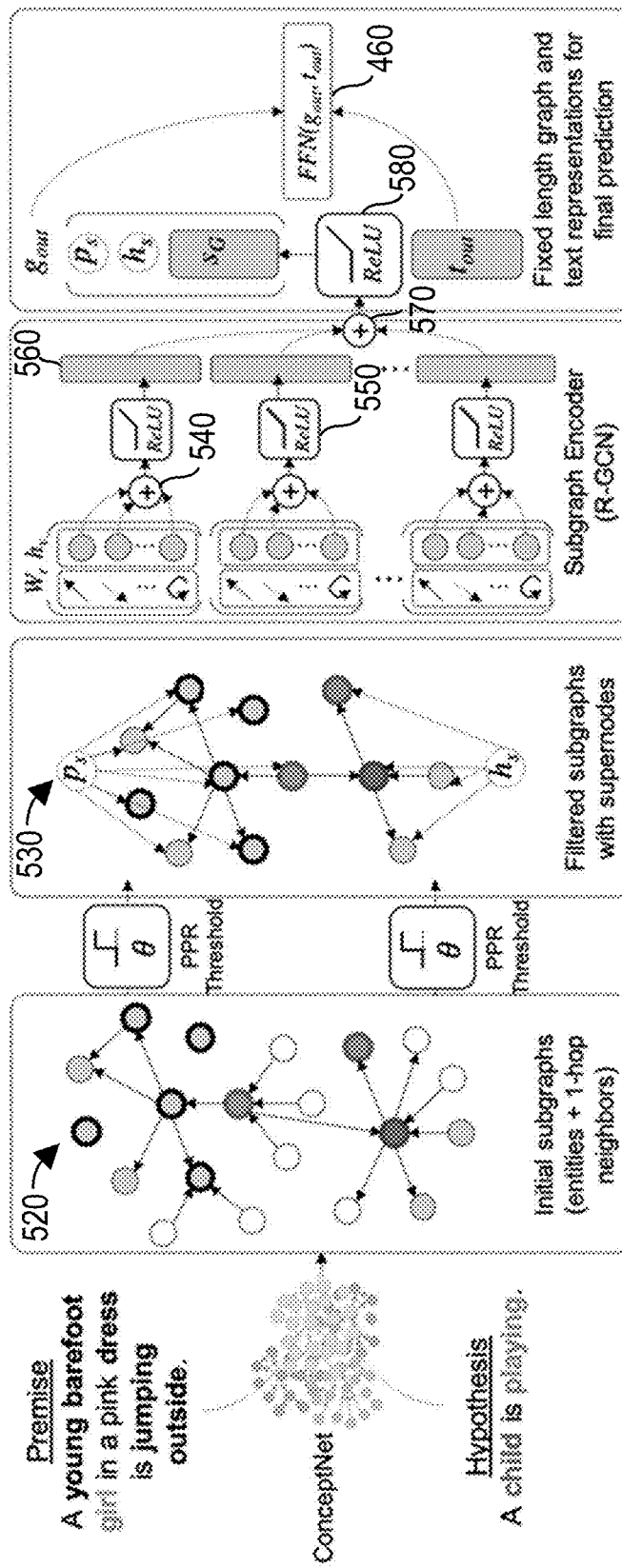
FIG. 7 illustrates an example workflow implemented by the NLP system, in accordance with an embodiment of the invention.

FIG. 7 illustrates an example workflow implemented by the NLP system 330, in accordance with an embodiment of the invention. Assume a NLP instance comprises a textual entailment problem and the system 330 receives the following text samples of the problem: (1) a premise text "A young barefoot girl in a pink dress is jumping outside.", and (2) a hypothesis text "A child is playing."

The system 330 embeds, via the subgraphs extraction system 400, the textual entailment problem in the graph-based knowledge space based on the premise text and the hypothesis text, resulting in a fixed size graph representation $g_{out}$. Specifically, the system 330 obtains a knowledge graph from a knowledge base or semantic network based on the premise text and the hypothesis text, and extracts a set 520 of initial subgraphs from the knowledge graph, via the extraction unit 410. The set 520 of initial subgraphs includes: (1) nodes representing entities of the premise text and the hypothesis text, and (2) additional nodes representing 1-hop neighbors of the entities.

The system 330 applies PPR to the set 520 of initial subgraphs via the filtering unit 420, resulting in a set 530 of filtered subgraphs, wherein each filtered subgraph satisfies a pre-determined PPR threshold. The set 530 of initial subgraphs includes: (1) a first filtered subgraph including a premise supernode $p_s$ and each node that the premise supernode $p_s$ is a parent of (i.e., each entity included in the premise text and each 1-hop neighbor of the entity, if any), and (2) a second filtered subgraph including a hypothesis supernode $h_s$ and each node that the hypothesis supernode $h_s$ is a parent of (i.e., each entity included in the hypothesis text and each 1-hop neighbor of the entity, if any).

The system 330 encodes the set 520 of filtered subgraphs via the encoding unit 430. In one embodiment, each filtered subgraph has a corresponding matrix representation $(W_r, h_v)$, wherein $h_v$ denotes a vector of nodes included in the filtered subgraph, and $W_r$ denotes an adjacency matrix (i.e., a matrix indicative of relationships (i.e., edges) between the nodes).

In one embodiment, the encoding unit 430 encodes the set 530 of filtered subgraphs via a R-GCN. In one embodiment, for each filtered subgraph of the set 530, the R-GCN encodes the filtered subgraph by combining nodes of the filtered subgraph via one or more linear units 540 and one or more Rectified Linear Units (ReLUs) 550, resulting in one or more hidden neural network layers 560. The encoding unit 430 combines each resulting hidden neural network layer 560 via a linear unit 570 and a ReLU 580, resulting in a final embedding (or vector representation) $s_G$ representing external knowledge, a final embedding (or vector representation) of the premise supernode $p_s$, and a final embedding (or vector representation) of the hypothesis supernode $h_s$. The encoding unit 430 generates a fixed size graph representation $g_{out}$ comprising the final embedding of the premise supernode $p_s$, the final embedding of the hypothesis supernode $h_s$, and the final embedding $s_G$ representing external knowledge.

The system 330 embeds, via the text embedding unit 450, the textual entailment problem in the text-based knowledge space based on the premise text and the hypothesis text, resulting in a fixed size text representation $t_{out}$.

The system 330 classifies the textual entailment problem with a final prediction (e.g., entailment/entails, contradiction/contradicts, neutral) based on the fixed size graph representation $g_{out}$ and the fixed size text representation $t_{out}$, via the classifier 460.

Figure 8:
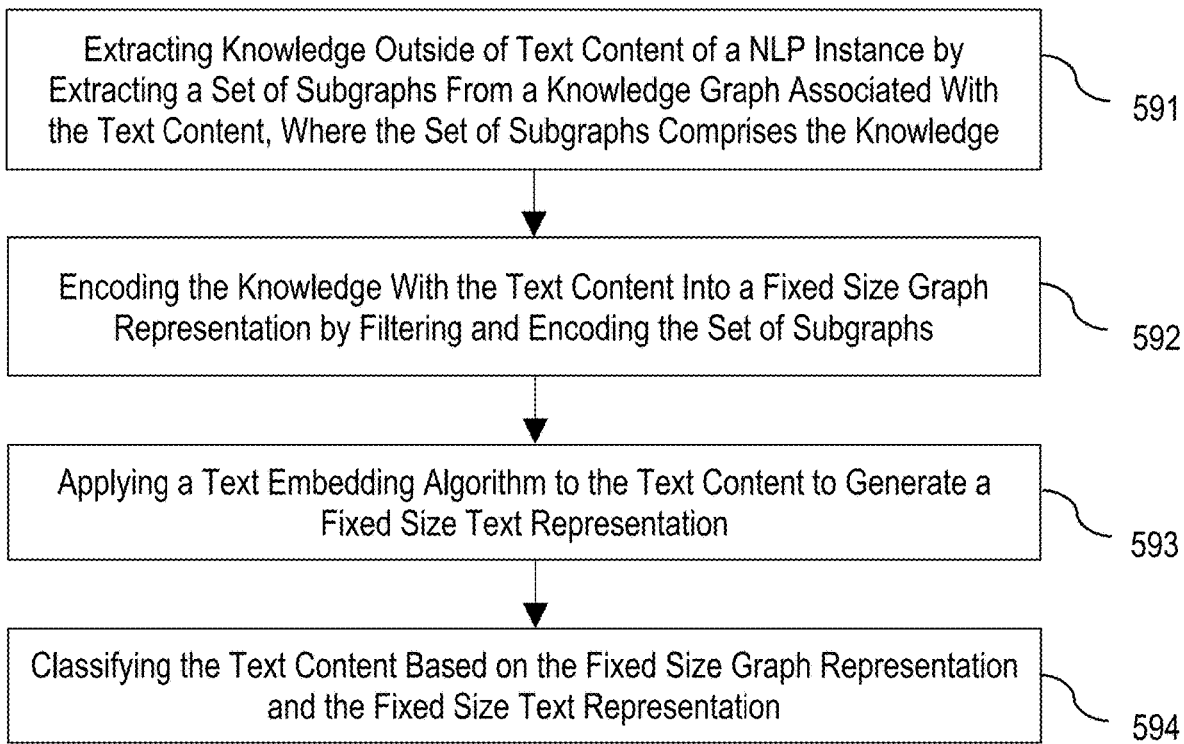
FIG. 8 is a flowchart for an example process for NLP, in accordance with an embodiment of the invention.

FIG. 8 is a flowchart for an example process 590 for NLP, in accordance with an embodiment of the invention. Process block 591 includes extracting knowledge outside of text content of a NLP instance by extracting a set of subgraphs from a knowledge graph associated with the text content, where the set of subgraphs comprises the knowledge. Process block 592 includes encoding the knowledge with the text content into a fixed size graph representation by filtering and encoding the set of subgraphs. Process block 593 includes applying a text embedding algorithm to the text content to generate a fixed size text representation. Process block 594 includes classifying the text content based on the fixed size graph representation and the fixed size text representation.

In one embodiment, process blocks 591-594 are performed by one or more components of the system 330, such as the subgraphs extraction system 400, the text embedding unit 450, and the classifier 460.

Figure 9:
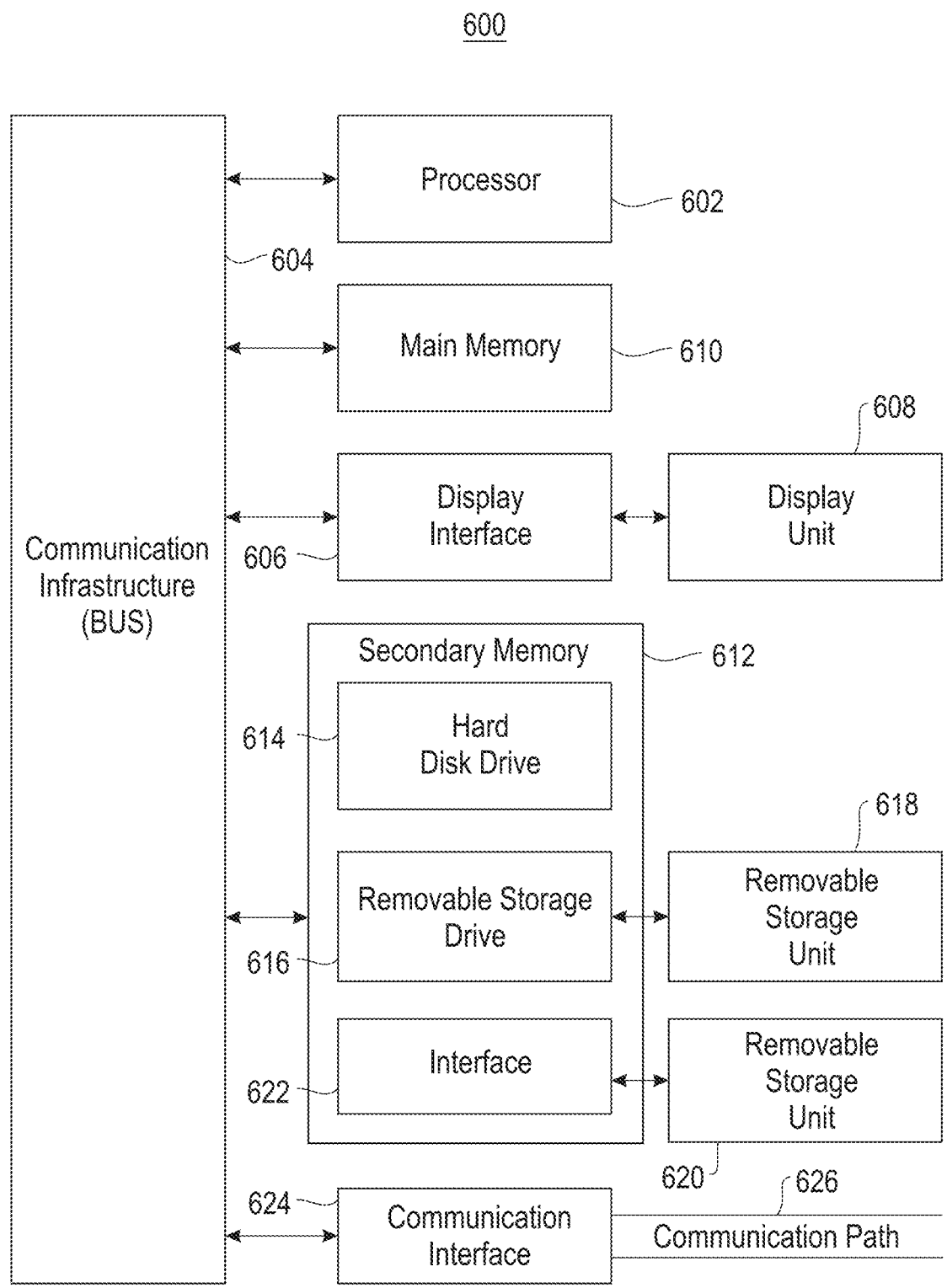
FIG. 9 is a high level block diagram showing an information processing system useful for implementing an embodiment of the invention.

FIG. 9 is a high level block diagram showing an information processing system 600 useful for implementing one embodiment of the invention. The computer system includes one or more processors, such as processor 602. The processor 602 is connected to a communication infrastructure 604 (e.g., a communications bus, cross-over bar, or network).

The computer system can include a display interface 606 that forwards graphics, text, and other data from the voice communication infrastructure 604 (or from a frame buffer not shown) for display on a display unit 608. In one embodiment, the computer system also includes a main memory 610, preferably random access memory (RAM), and also includes a secondary memory 612. In one embodiment, the secondary memory 612 includes, for example, a hard disk drive 614 and/or a removable storage drive 616, representing, for example, a floppy disk drive, a magnetic tape drive, or an optical disk drive. The removable storage drive 616 reads from and/or writes to a removable storage unit 618 in a manner well known to those having ordinary skill in the art. Removable storage unit 618 represents, for example, a floppy disk, a compact disc, a magnetic tape, or an optical disk, etc. which is read by and written to by removable storage drive 616. As will be appreciated, the removable storage unit 618 includes a computer readable medium having stored therein computer software and/or data.

In alternative embodiments, the secondary memory 612 includes other similar means for allowing computer programs or other instructions to be loaded into the computer system. Such means include, for example, a removable storage unit 620 and an interface 622. Examples of such means include a program package and package interface (such as that found in video game devices), a removable memory chip (such as an EPROM, or PROM) and associated socket, and other removable storage units 620 and interfaces 622, which allows software and data to be transferred from the removable storage unit 620 to the computer system.

In one embodiment, the computer system also includes a communication interface 624. Communication interface 624 allows software and data to be transferred between the computer system and external devices. In one embodiment, examples of communication interface 624 include a modem, a network interface (such as an Ethernet card), a communication port, or a PCMCIA slot and card, etc. In one embodiment, software and data transferred via communication interface 624 are in the form of signals which are, for example, electronic, electromagnetic, optical, or other signals capable of being received by communication interface 624. These signals are provided to communication interface 624 via a communication path (i.e., channel) 626. In one embodiment, this communication path 626 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for natural language processing (NLP), comprising:
    extracting knowledge outside of text content of a NLP instance by extracting a set of subgraphs from a knowledge graph associated with the text content, wherein the set of subgraphs comprises the knowledge;
    encoding the knowledge with the text content into a fixed size graph representation by filtering and encoding the set of subgraphs, wherein the fixed size graph representation includes at least one filtered subgraph comprising only nodes that satisfy a pre-determined threshold;
    applying a text embedding algorithm to the text content to generate a fixed size text representation; and
    classifying the text content based on the fixed size graph representation and the fixed size text representation.

2. The method of claim 1, wherein the knowledge graph is one of a knowledge base, a semantic network, or a social graph.

3. The method of claim 1, wherein the text content comprises one or more text samples.

4. The method of claim 3, wherein the one or more text samples include a premise and a hypothesis.

5. The method of claim 3, wherein the knowledge graph comprises one of a directed graph representation or an undirected graph representation of the one or more text samples.

6. The method of claim 1, wherein the set of subgraphs is encoded via a Relational Graph Convolutional Network (R-GCN).

7. The method of claim 1, wherein the set of subgraphs is filtered based on a personalized page rank (PPR) algorithm.

8. The method of claim 1, wherein the text content is classified via a Feed Forward Network (FFN).

9. The method of claim 1, wherein the text embedding algorithm comprises one of Bidirectional Encoder Representations from Transformers (BERT) or Global Vectors (GloVe).

10. A system for natural language processing (NLP), comprising:
   at least one processor; and
   a non-transitory processor-readable memory device storing instructions that when executed by the at least one processor causes the at least one processor to perform operations including:
      extracting knowledge outside of text content of a NLP instance by extracting a set of subgraphs from a knowledge graph associated with the text content, wherein the set of subgraphs comprises the knowledge;
      encoding the knowledge with the text content into a fixed size graph representation by filtering and encoding the set of subgraphs, wherein the fixed size graph representation includes at least one filtered subgraph comprising only nodes that satisfy a pre-determined threshold;
      applying a text embedding algorithm to the text content to generate a fixed size text representation; and
      classifying the text content based on the fixed size graph representation and the fixed size text representation.

11. The system of claim 10, wherein the knowledge graph is one of a knowledge base, a semantic network, or a social graph.

12. The system of claim 10, wherein the text content comprises one or more text samples.

13. The system of claim 12, wherein the one or more text samples include a premise and a hypothesis.

14. The system of claim 12, wherein the knowledge graph comprises one of a directed graph representation or an undirected graph representation of the one or more text samples.

15. The system of claim 10, wherein the set of subgraphs is encoded via a Relational Graph Convolutional Network (R-GCN).

16. The system of claim 10, wherein the set of subgraphs is filtered based on a personalized pagerank (PPR) algorithm.

17. The system of claim 10, wherein the text content is classified via a Feed Forward Network (FFN).

18. The system of claim 10, wherein the text embedding algorithm comprises one of Bidirectional Encoder Representations from Transformers (BERT) or Global Vectors (GloVe).

19. A computer program product for natural language processing (NLP), the computer program product comprising a computer readable storage medium having program instructions embodied therewith, the program instructions executable by a processor to cause the processor to:
   extracting knowledge outside of text content of a NLP instance by extracting a set of subgraphs from a knowledge graph associated with the text content, wherein the set of subgraphs comprises the knowledge;
   encoding the knowledge with the text content into a fixed size graph representation by filtering and encoding the set of subgraphs, wherein the fixed size graph representation includes at least one filtered subgraph comprising only nodes that satisfy a pre-determined threshold;
   applying a text embedding algorithm to the text content to generate a fixed size text representation; and
   classifying the text content based on the fixed size graph representation and the fixed size text representation.

20. The computer program product of claim 19, wherein the knowledge graph is one of a knowledge base, a semantic network, or a social graph.

\* \* \* \* \*